United States Patent
Taniguchi

(10) Patent No.: US 10,423,627 B2
(45) Date of Patent: Sep. 24, 2019

(54) SERVER FOR ASSIGNING RANKS TO USERS AND METHOD THEREFOR

(71) Applicant: LINE Corporation, Tokyo (JP)

(72) Inventor: Tomohiko Taniguchi, Tokyo (JP)

(73) Assignee: LINE CORPORATION, Tokyo (JP)

( * ) Notice: Subject to any disclaimer, the term of this patent is extended or adjusted under 35 U.S.C. 154(b) by 368 days.

(21) Appl. No.: 14/838,300

(22) Filed: Aug. 27, 2015

(65) Prior Publication Data

US 2016/0314124 A1    Oct. 27, 2016

(30) Foreign Application Priority Data

Apr. 22, 2015 (JP) ................................. 2015-087373

(51) Int. Cl.
*G06F 17/30* (2006.01)
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
None
See application file for complete search history.

(56) References Cited

U.S. PATENT DOCUMENTS

| 2013/0197988 | A1* | 8/2013 | Natsume | G06Q 30/0233 705/14.33 |
| 2013/0212173 | A1* | 8/2013 | Carthcart | G06Q 50/01 709/204 |
| 2013/0262320 | A1* | 10/2013 | Makanawala | H04L 51/32 705/304 |
| 2016/0092040 | A1* | 3/2016 | Sherman | H04L 51/32 715/752 |

FOREIGN PATENT DOCUMENTS

JP    2013-030159 A    2/2013

OTHER PUBLICATIONS

Japanese Office Action dated Jul. 16, 2019 issued in corresponding Japanese Application No. 2015-087373 (Partial English translation provided).

* cited by examiner

*Primary Examiner* — Thu N Nguyen
(74) *Attorney, Agent, or Firm* — Harness, Dickey & Pierce, P.L.C.

(57) ABSTRACT

The present inventive concepts encourage users to actively form friend relationships and also incentivize users to actively utilize services provided by an SNS and the like by assigning ranks to users in consideration of the users' friend relationships. A management server including a memory configured to store computer-readable instructions, and one or more processors configured to execute the instructions to determine a personal rank of a target user based on a personal utilization record for the target user, obtain the personal rank of at least one related user who is associated with the target user, and derive an overall rank of the target user based on the personal rank of the at least one related user and the personal rank of the target user may be provided.

20 Claims, 7 Drawing Sheets

[FIG. 1]
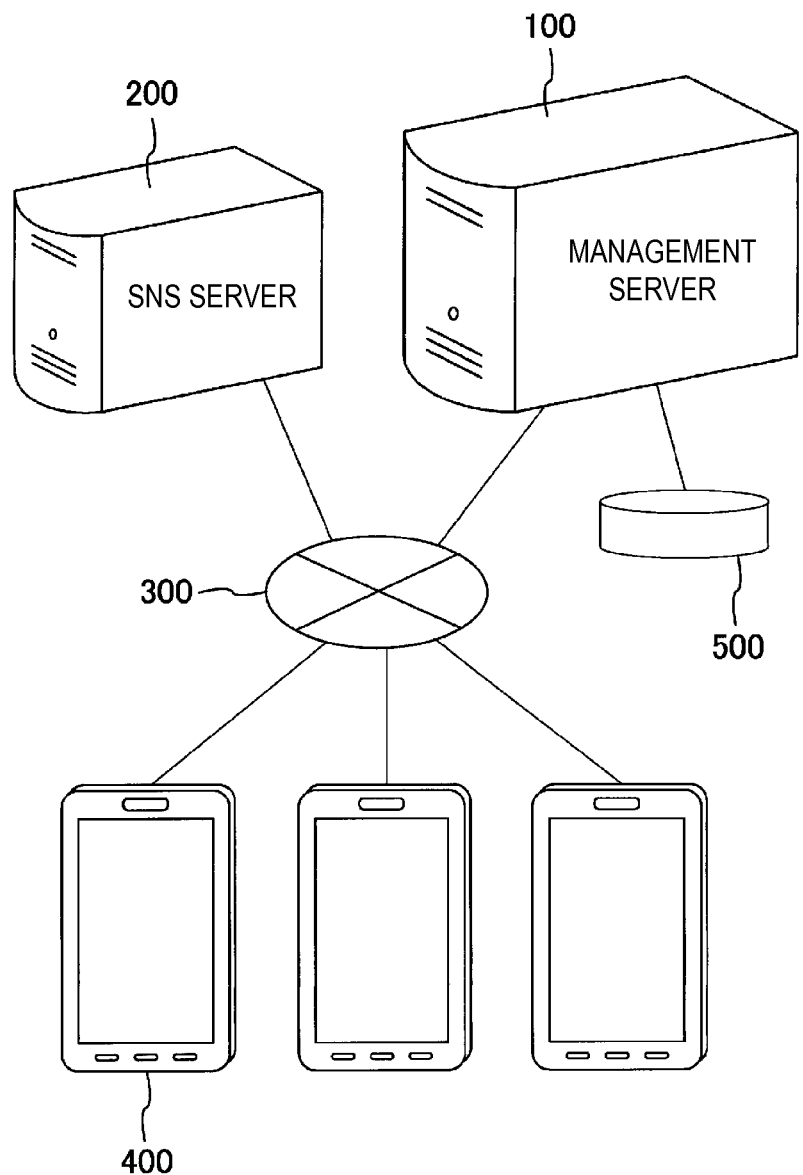

[FIG. 2]
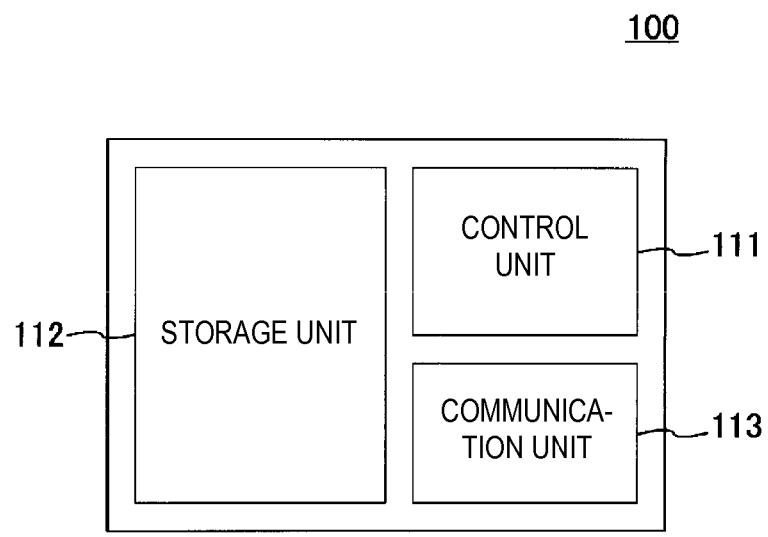
[FIG. 3]
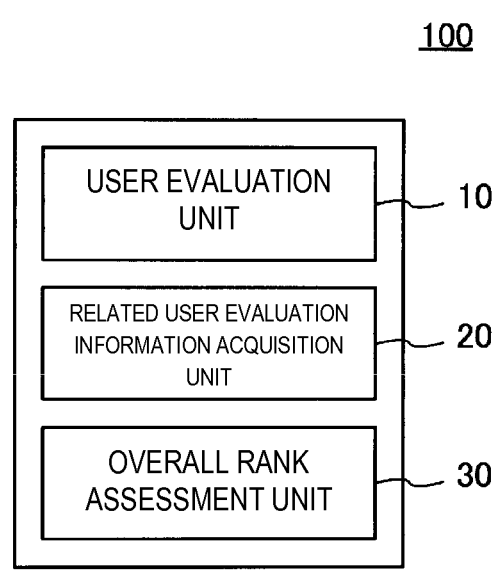

[FIG. 4]
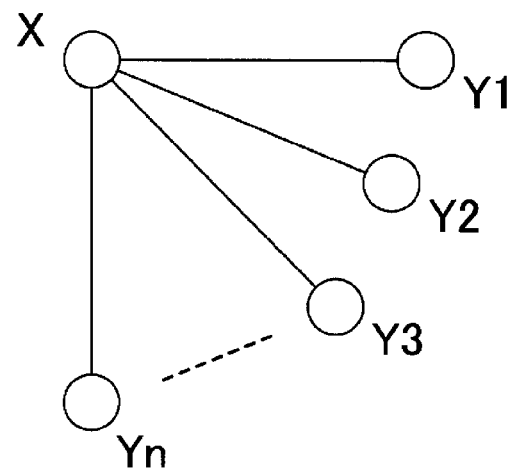
[FIG. 5]
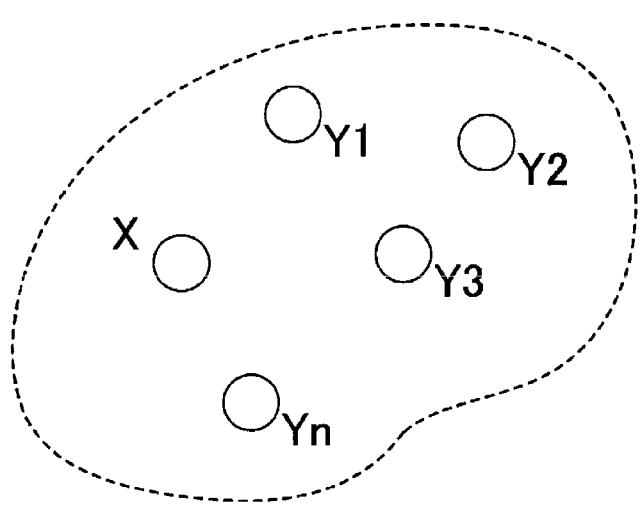

[FIG. 6]
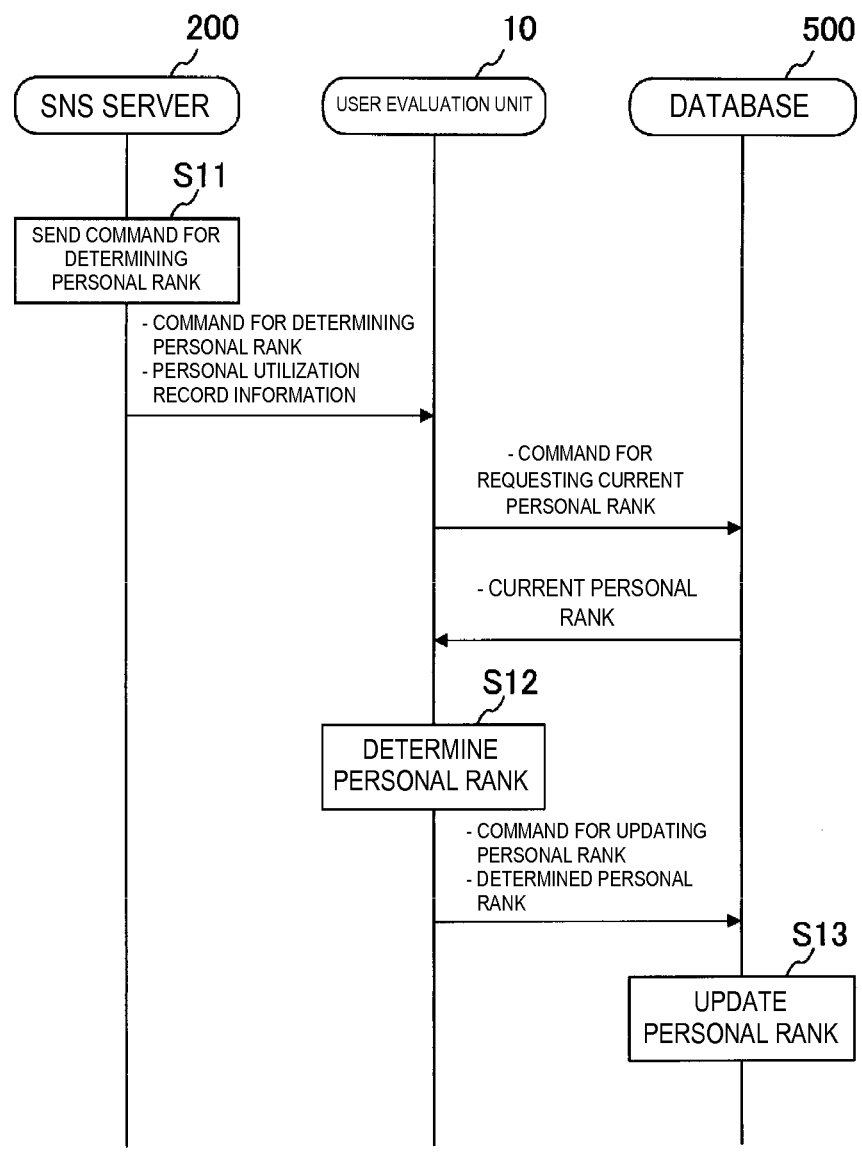

[FIG. 7]
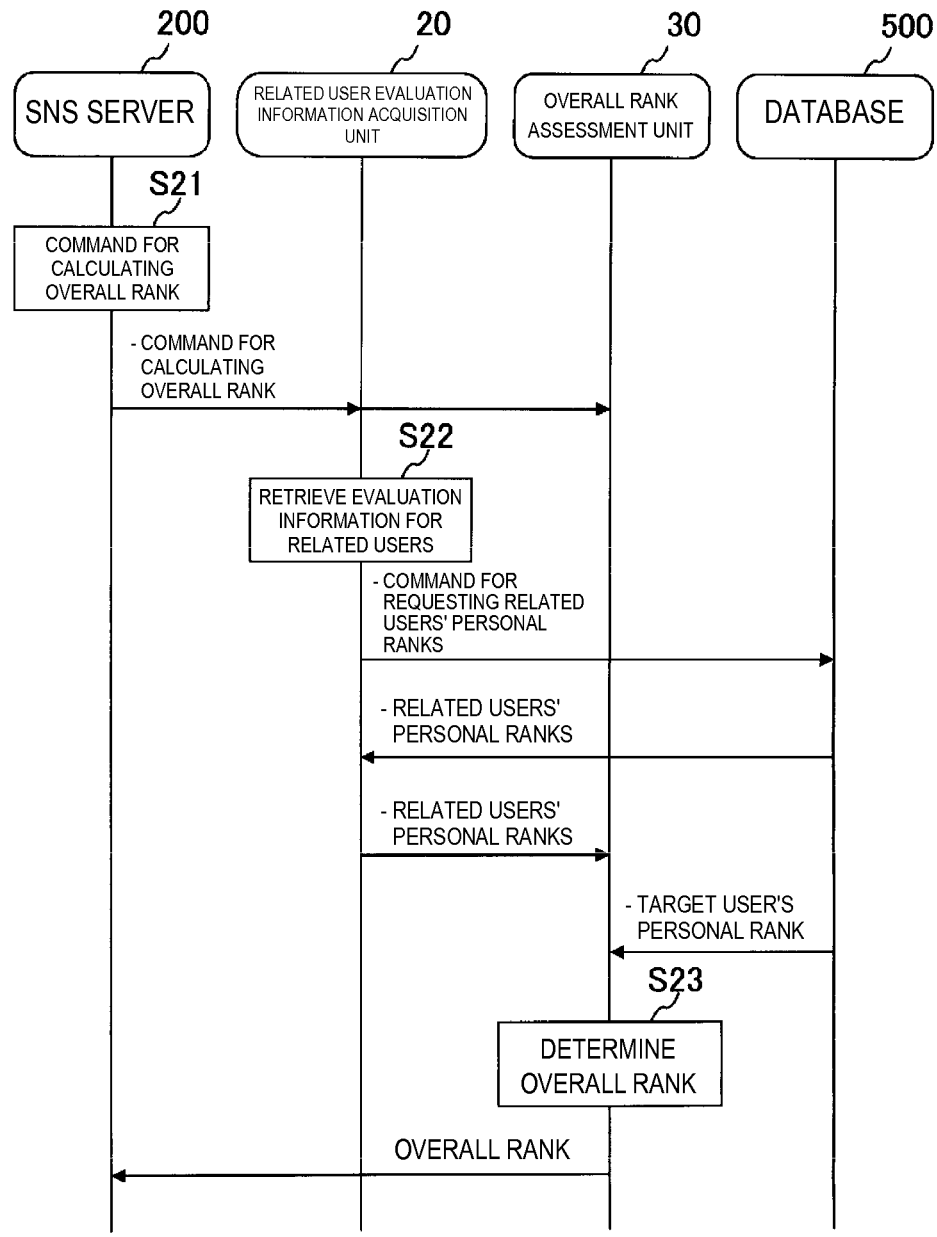

[FIG. 8]
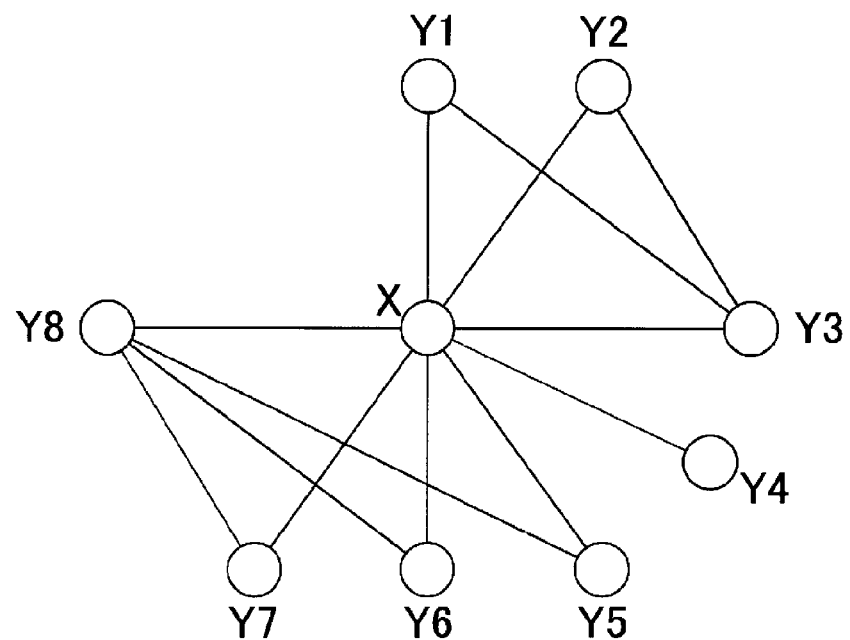

[FIG. 9]
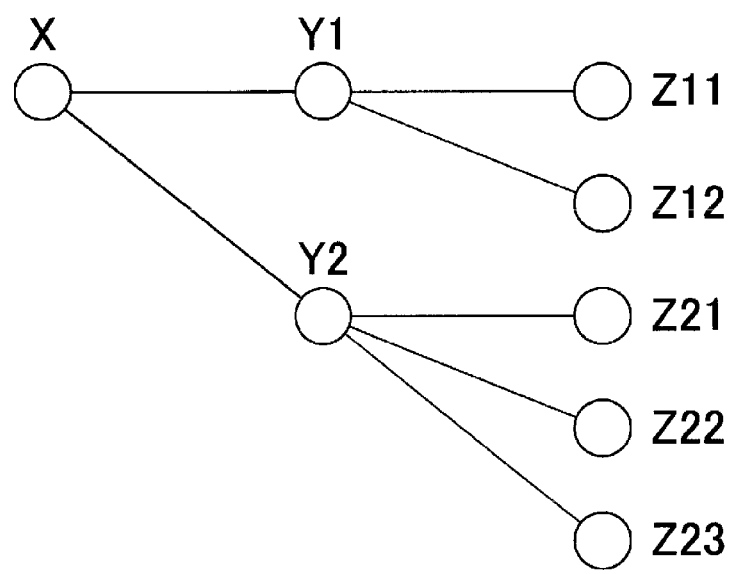
[FIG. 10]
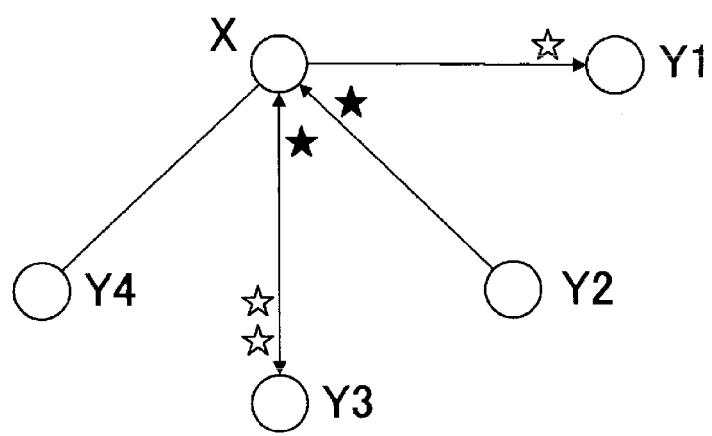

SERVER FOR ASSIGNING RANKS TO USERS AND METHOD THEREFOR

CROSS-REFERENCE TO RELATED APPLICATION

This U.S. non-provisional application claims the benefit of priority under 35 U.S.C § 119 to Japanese Patent Application No. 2015-087373 filed on Apr. 22, 2015, in the Japanese Patent Office (JPO), the disclosure of which is incorporated herein in its entirety by reference.

BACKGROUND

1. Field

The present inventive concepts relate to management servers for assigning ranks to users and/or methods therefor which can be applied to a social networking service (SNS).

2. Description of the Related Art

Generally, conventional membership management systems assign points and/or a rank to a user based on the amount of money the user has spent and rewards the user with a privilege (e.g., price discount of a service in accordance with the points and/or rank each time the user uses the service). In connection with such systems, a management device for managing a website is disclosed by Japanese Patent Application Laid-Open No. 2013-30159. According to this Japanese document, the management device compares the rank of a user who wants to utilize a service with the ranks of other users who have friend relationships with the user, and applies the highest rank to provide a privilege with which the user can utilize the service.

This management device for managing a website compares the rank of a user with the ranks of other users who have friend relationships with the user and applies the best rank to the user. In this technique, however, the real aspects of a friend relationship between users are not always reflected because it does not take into account what kind of relation connects the user of interest with the other user who has the best rank and has a friend relationship with him. For example, since a high rank is applied just by formally becoming a friend with a user, developing friend relationships in a true sense is not incentivized and/or activities of members may not be sufficiently encouraged.

In view of the foregoing drawbacks of the conventional membership management systems and/or methods, encouraging users to actively form friend relationships and/or incentivizing users to actively utilize services provided by an SNS and the like by assigning ranks to users in consideration of the users' friend relationships are desired.

SUMMARY

A management server according to an aspect of the present inventive concepts include a memory configured to store computer-readable instructions, and one or more processors configured to execute the instructions to determine a personal rank of a target user based on a personal utilization record for the target user, obtain the personal rank of at least one related user who is associated with the target user, and derive an overall rank of the target user based on the personal rank of the at least one related user to the personal rank of the target user.

In some example embodiments, the one or more processors may be further configured to execute the instructions to derive the overall rank of the target user based on closeness between the target user and the related user.

In some example embodiments, the closeness may be calculated based on a number of common friends between the target user and the related user.

In some example embodiments, the closeness may be calculated based on frequency of communications between the target user and the related user.

In some example embodiments, the related user may be associated with the target user via a mutually accepted friend relationship.

In some example embodiments, the one or more processors may be further configured to execute the instructions to derive the overall rank of the target user based on a duration of the friend relationship.

In some example embodiment, the one or more processors may be further configured to execute the instructions to adjust the personal rank based on an evaluation result.

In some example embodiments, the evaluation may cause a decrease in the personal rank when a user from among the target user and the at least one related user has utilized a service against prescribed conditions of usage.

In some example embodiments, the one or more processors may be further configured to execute the instructions to obtain the personal rank of an indirectly related user who is directly associated with the related user via a friend relationship, while being not directly associated with the target user.

In some example embodiments, the one or more processors may be further configured to execute the instructions to derive the overall rank of the target user based on content present information between the target user and the related user.

A method for assigning user ranks in a membership management server, which includes a memory configured to store computer-readable instructions and one or more processors configured to execute the instructions, according to another aspect of the present inventive concepts includes determining, by the one or more processors, a personal rank of a target user based on a personal utilization record for the target user, obtaining, by the one or more processors, a personal rank of at least one related user who is associated with the target user, deriving, by the one or more processors, an overall rank of the target user based on the personal rank of the at least one related user and the personal rank of the target user, and rewarding the target user based on the derived overall rank.

According to some example embodiment, the present inventive concepts can encourage users of an SNS or the like to actively form friend relationships and/or incentivize users to actively utilize services provided by an SNS and the like.

BRIEF DESCRIPTION OF THE DRAWINGS

Example embodiments will be more clearly understood from the following brief description taken in conjunction with the accompanying drawings. FIGS. 1-10 represent non-limiting, example embodiments as described herein.

FIG. 1 illustrates relationships between a management server according to an example embodiment of the present inventive concepts which assigns ranks to users and which can be applied to an SNS for example, users' terminal devices, and an SNS server;

FIG. 2 shows a hardware configuration of a management server 100 according to an example embodiment of the present inventive concepts;

FIG. 3 shows a functional configuration of the management server 100 according to an example embodiment of the present inventive concepts;

FIG. 4 schematically shows users who are associated with each other in an example embodiment of the present inventive concepts;

FIG. 5 schematically shows users who are associated with each other in an example embodiment of the present inventive concepts;

FIG. 6 shows a process flow of operations of the management server 100 according to an example embodiment of the present inventive concepts to determine a personal rank;

FIG. 7 shows a process flow of operations of the management server 100 according to an example embodiment of the present inventive concepts to derive an overall rank;

FIG. 8 schematically shows friend relationships between a target user and his related users in an example embodiment of the present inventive concepts;

FIG. 9 schematically illustrates relationships between related users and indirectly related users in an example embodiment of the present inventive concepts; and FIG. 10 is a schematic illustration representing exchanges of content as presents between a target user and users related to the target user in an example embodiment of the present inventive concepts.

DETAILED DESCRIPTION

Some example embodiments of the present inventive concepts will be described below with reference to the drawings. Note that the present inventive concepts can be carried out in many different modes and should not be construed as limited to the example embodiments illustrated below. In the specification and figures, similar elements already described in relation to other figures are denoted with the same reference numerals and detailed description of such an element may not be repeated.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Expressions such as "at least one of," when preceding a list of elements, modify the entire list of elements and do not modify the individual elements of the list.

Example embodiments of inventive concepts can be embodied as hardware, software, or combinations of hardware and software. Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), a flash memory, CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

Hereinafter, some example embodiments will be explained in further detail with reference to the accompanying drawings <Overview of Management Server that Assigns Ranks to Users>

FIG. 1 illustrates relationships between a management server 100 according to an example embodiment of the present inventive concepts which assigns ranks to users and which can be applied to an SNS. Referring to FIG. 1, an SNS server 200 may provide SNS services to user terminal devices 400 and transmit and receive information to and from the user terminal devices 400. SNS services that can be provided by the SNS server 200 may include, for example, a chatting service, a voice call service, a music download service, online game services, food delivery services, taxi dispatch services, and/or a remittance and payment service for paying for an SNS subscription fee or for paying for an article or service purchase from affiliated online or physical stores.

The management server 100 may provide an overall rank of a personal user in response to a demand from the SNS server 200. Herein, a "rank" is assigned to each user based on the user's status of utilization (e.g., frequency of utilization, the amount of money spent for SNS services, and/or a variety of services associated with SNS services). Based on the user's rank, the user can get, for example, a discount on a service, issuance of a coupon, increase in transmission rate, increase in audio quality, access to additional features, allotment of points, and/or other kinds of privilege for services that are directly or indirectly provided by the SNS server 200.

The user terminal devices 400 should at least be communication terminals capable of being connected to a network 300 shown in FIG. 1. The user terminal devices 400 each may perform different functions. The user terminal devices 400 may be, for example, mobile phones, smartphones, tablet PCs, PDAs, personal computers, wearable terminals, personal handyphone services (PHSs), and the like.

While FIG. 1 shows a configuration in which the management server 100 and the SNS server 200 are connected by a network 300 as an example, the present inventive concepts are not limited to the configuration. For instance, the management server 100 and the SNS server 200 may be connected to each other by a different scheme other than the network 300 or a dedicated line. Additionally, the management server 100 and the SNS server 200 may not be physically or functionally separate entities. For example, the management server 100 may include some or all of the functions of the SNS server 200, and vice versa.

<Hardware Configuration of Management Server>

FIG. 2 is a block diagram showing the hardware configuration of the management server 100 according to an example embodiment of the present inventive concepts. Referring to FIG. 2, the management server 100 may include a control unit 111, a storage unit 112, and a communication unit 113.

The control unit 111 may include a central processing unit (CPU) and one or more storage devices (e.g., registers, memory, etc.). The control unit 111 may execute a program stored in the memory (e.g., the storage unit 112) included in the CPU). The control unit 111 may perform arithmetic processing in response to a command signal from, for example, the SNS server.

The storage unit 112 may be a hard disk, a solid state disk, or the like, which is capable of storing a large volume of data and/or programs used for, for example, arithmetic processing. In the storage unit 112, data resulting from the arithmetic processing performed by the control unit 111 and/or information received from the SNS server 200 may be stored temporarily or for a certain time period.

The communication unit 113 may control data transmission and reception to and from the SNS server 200 over the network 300.

According to some example embodiments, the management server 100 may include a processor configured to execute computer readable instructions (or program) stored in a memory and configured to perform, for example, arithmetic processing in response to a command signal from the SNS server, data transmission and reception to and from the SNS server, etc.

<Functional Configuration of Management Server>

FIG. 3 is a block diagram showing the functional configuration of the management server 100 according to an example embodiment of the present inventive concepts. Referring to FIG. 3, the management server 100 may include a user evaluation unit 10, a related user evaluation information acquisition unit 20, and an overall rank assessment unit 30.

The user evaluation unit 10 may determine a personal rank of a user based on the user's personal utilization record for a variety of SNS services. For example, the user evaluation unit 10 may obtain information on the personal utilization record for the user from the SNS server 200, determine the personal rank of the user, and save the determined personal rank in the storage disk 112 of the management server 100. According to some example embodiments, the determined personal rank may be saved in a database 500, which is connected to the management server 100 by a dedicated line. The database 500 may also be connected to the management server 100 through the network 300, in which case the database 500 may be accessible from the SNS server 200.

The ranks may be symbols representing the highest to lowest ranks, such as SS, S, A, B, . . . F, or numerical values within a certain range. The following description will use ranks represented by numerical values. A greater rank value means a higher rank, based on which a greater benefit can be provided to the user. Conversely, a smaller rank value means a lower rank.

A user is given an initial rank value by the management server 100 when the user starts to utilize an SNS service. The initial rank value may be set to be a same value for all users, or different initial values may be given to respective users depending on the terms of use (e.g., a campaign period established by the provider of an SNS service) for an SNS service under which the individual users start to utilize an SNS service. The rank may be increased or decreased in accordance with the user's utilization of SNS services.

The related user evaluation information acquisition unit 20 may obtain the personal rank of the target user and personal ranks of one or more other users who are associated with the target user. The term "being associated" with a target user means that some common attribute (e.g., having a friend relationship with the user in an SNS service, belonging to the same group, etc.) is present between the target user and the other associated users. In particular, according to some example embodiments of the present inventive concepts, to incentivize users' active utilization of SNS or like services, "being associated" with a user may mean that the users are associated with each other via a friend relationship that has been mutually accepted. To reflect the real relation between users in rank assignment, "being associated" may mean that the users are associated with each other via a mutually accepted friend relationship.

Examples of a mutually accepted friend relationship may include a case in which user A sends a friend request to user B and user B accepts the request to establish a friend relationship between them, or a case in which user A sends user B an invitation message for a group to which user A belongs and user B accepts the message to become a member of the group.

FIG. 4 schematically shows users who are associated with each other on the management server 100 according to an example embodiment of the present inventive concepts. In FIG. 4, X, Y1, Y2, Y3, . . . , and Yn each represent respective users. X is connected to Y1, Y2, Y3, . . . , and Yn by lines, meaning that X is associated with Y1, Y2, Y3, . . . , and Yn. For example, when the associations are friend relationships, X has friend relationships with n users, Y1, Y2, Y3, . . . , and Yn, in the illustrated example.

FIG. 5 schematically shows users who are associated with each other on the management server 100 according to an example embodiment of the present inventive concepts. Again, X, Y1, Y2, Y3, . . . , and Yn each represent respective users. In FIG. 5, the users X and Y1, Y2, Y3, . . . , and Yn are enclosed by a dotted line, meaning that the users X and Y1, Y2, Y3, . . . , and Yn belong to the same group.

The overall rank assessment unit 30 may add the rank(s) of one or more persons who is/are related to the target user to the personal rank of the target user, thereby deriving the overall rank of the target user.

<Operation of Management Server>

Turning to FIGS. 6 and 7, the operation of the management server 100 according to an example embodiment of the present inventive concepts will be described.

FIG. 6 shows a process flow of operations of the management server 100 according to an example embodiment of the present inventive concepts to determine a personal rank. The SNS server 200 sends a command for determining a personal rank to the user evaluation unit 10 of the management server 100 (S11). The user evaluation unit 10 receives the command for determining a personal rank from the SNS server 200. The command for determining a personal rank may include information, for example, names, IDs, attributes of one or more users for which personal ranks are to be determined, etc. When receiving the command for determining a personal rank, the user evaluation unit 10 may further receive personal utilization record information describing, for example, the users' utilization of SNS services.

The user evaluation unit 10 then may send a command for requesting current personal ranks to the database 500 in order to obtain the current personal ranks and obtains the current personal ranks from the database 500.

The user evaluation unit 10 then may calculate and determine personal ranks based on the command for determining a personal rank and the personal utilization record information received from the SNS server 200, and the current personal ranks obtained from the database 500 (S12).

Next, the user evaluation unit 10 may send a command for updating a personal rank to the database 500 and sends the personal ranks determined by the user evaluation unit 10. The database 500 may update personal ranks in response to the command for updating a personal rank and the personal ranks determined by and received from the user evaluation unit 10 (S13).

While FIG. 6 shows that the user evaluation unit 10 performs operations for determining personal ranks in response to a command from the SNS server 200, example embodiment of the present inventive concepts are not limited thereto. For example, personal utilization records may be stored in a database accessible from the SNS server 200 and/or the management server 100, and the user evaluation unit 10 may be configured to periodically access the database and determine personal ranks.

FIG. 7 shows a process flow of operations of the management server 100 according to an example embodiment of the present inventive concepts to derive an overall rank. The SNS server 200 may send a command for calculating an overall rank to the management server 100 in order to determine an overall rank (S21). The related user evaluation information acquisition unit 20 and the overall rank assessment unit 30 of the management server 100 may directly or indirectly receive the command for calculating an overall rank from the SNS server 200.

The related user evaluation information acquisition unit 20 may send a command for requesting the personal ranks of related users to the database 500 to obtain personal ranks of related users (S22). The range of related users may be determined based on information and/or a command that accompanies the command for calculating an overall rank received from the SNS server 200.

The overall rank assessment unit 30 may obtain the personal ranks of the related users from the related user evaluation information acquisition unit 20. The overall rank assessment unit 30 may further obtain the personal rank of the user for which an overall rank is to be determined from the database 500. According to some example embodiments, the target user's personal rank may further be obtained when the related user evaluation information acquisition unit 20 obtains the personal ranks of the related users from the database 500. The overall rank assessment unit 30 may derive and determine the overall rank based on the personal rank of the target user and the personal ranks of the related users (S23). The overall rank assessment unit 30 may send the determined overall rank to the SNS server 200.

Although not illustrated, a membership server 100 may reward the user of the SNS service with a privilege (e.g., price discount of a service in accordance with the points and/or rank each time the user uses the service), based on the overall rank received from the management server 100.

The overall rank may be determined by one or a combination of the example methods of deriving an overall rank described below. The overall rank assessment unit 30 may determine an overall rank in accordance with a prescribed method of deriving the overall rank. According to some example embodiments, the overall rank assessment unit 30 may determine the overall rank in accordance with a method for calculating an overall rank that is specified in a command received from the SNS server 200.

<Example Methods for Deriving an Overall Rank>

Some example methods for deriving an overall rank will be described in detail below.

One method for deriving an overall rank may be to simply add the ranks of multiple persons who are related to the user of interest (e.g., the target user). For the example of FIG. 4, suppose that user X is the user for which the overall rank is to be derived, and users Y1, Y2, Y3, . . . , and Yn are users who are related to user X. The user X's personal rank is represented as RX, and the personal ranks of users Y1, Y2, Y3, . . . , and Yn are represented as RY1, RY2, RY3, . . . , and RYn, respectively. Then, the overall rank TRX of user X is represented by TRX=RX+RY1+RY2+RY3+ . . . +RYn.

Another method of deriving an overall rank may be to add a certain number of highest ranks among the personal ranks of persons who are related to the user of interest. For the example of FIG. 4, suppose that users Y1, Y2, Y3, . . . , and Yn have personal ranks RY1, RY2, RY3, . . . , and RYn, respectively, and the ranks are RY2> RY1> . . . >RYn> . . . >RY3. In the case of adding two highest ranks, the overall rank TRX of user X will be represented by TRX=RX+RY2+RY1.

Yet another method of deriving an overall rank may be adding the average of the personal ranks of persons who are related to the user of interest. If n users Y1, Y2, Y3, . . . , and Yn have personal ranks RY1, RY2, RY3, . . . , and RYn, respectively in the example of FIG. 4, then the user X's overall rank TRX is represented by TRX=RX+(RY1+RY2+ RY3+ . . . +RYn)/n.

<Deriving an Overall Rank Based on Closeness Between Users>

The overall rank assessment unit 30 of the management server 100 according to an example embodiment of the present inventive concepts may derive the overall rank based on the closeness between the target user and his related users. As examples of deriving the overall rank based on closeness, a calculation method based on frequency of communications and a calculation method based on the number of common friends will be shown.

Calculation Method Based on Frequency of Communications

The closeness between users who have a friend relationship in an SNS service is believed to be more intimate as they perform communication (e.g., exchanging messages, making voice calls) more frequently. Table 1 below shows frequencies of communications and corresponding values of a correction factor $\alpha$. The correction factor $\alpha$ assumes a greater value with a higher frequency of communications.

TABLE 1

| Frequency of communications | Correction factor $\alpha$ |
|---|---|
| Ten or more times a day | 2.0 |
| Five or more times a day | 1.5 |
| Two or more times a day | 1.2 |
| Once or more a day | 1.0 |
| Once or more in two days | 0.8 |
| Once or more a week | 0.6 |
| Once or more in two weeks | 0.4 |
| Once or more a month | 0.3 |
| Once or more in three months | 0.2 |
| Once or more in six months | 0.1 |
| Less than once in six months | 0.0 |

By way of example, suppose that for user X, related users Y1, Y2, Y3, . . . , and Yn are present and they have personal ranks of RX, RY1, RY2, RY3, . . . , and RYn, respectively. Correction factors $\alpha$ corresponding to the frequency of communications between user X and related users Y1, Y2, Y3, . . . , and Yn are denoted as $\alpha 1$, $\alpha 2$, $\alpha 3$, . . . , and $\alpha n$, respectively. Then, the user X's overall rank TRX may be calculated as TRX=RX+$\alpha 1 \times$RY1+$\alpha 2 \times$RY2+$\alpha 3 \times$RY3+ . . . +$\alpha n \times$RYn.

Given that user X communicates with the related user Y1 at a frequency of five or more times a day and with the user Y2 at a frequency of once or more in six months, the corresponding correction factors will be $\alpha 1$=1.5 and $\alpha 2$=0.1, respectively. If the related users Y1 and Y2 have personal ranks RY1 and RY2 of 4.0 and 7.0 respectively, their corrected personal ranks will be $\alpha 1 \times$RY1=6.0 and $\alpha 2 \times$RY2=0.7. In this manner, when the correction factor $\alpha$ corresponding to the frequency of communications is used in calculation of the overall rank TRX, the personal rank of a related user who has a higher frequency of communications is corrected in an increasing direction, while the personal rank of a related user who has a lower frequency of communications is corrected in a decreasing direction.

Calculation based on the frequency of communications is not limited to the foregoing method. The ranges of frequency of communications and correction factor values shown in Table 1 may be applied with appropriate modifications. Also, without using a correction factor, only the personal ranks of a certain number of related users who have the highest frequency of communications may be used in calculation of an overall rank. It is also possible not to use the personal rank of a related user in calculation of the overall rank if the user's frequency of communications is lower than a certain threshold frequency.

As described above, when a calculation method based on the frequency of communications is employed in derivation of an overall rank, the personal ranks of related users who have a high frequency of communications are reflected more in calculating the overall rank. Thus, an overall rank that corresponds to the reality of friend relationships more closely than when related users' ranks are used in a simple manner can be derived. Further, deriving an overall rank that corresponds with the reality of friend relationships between users and applying the reality of friend relationships to various services can encourage users to more actively utilize SNS services. Because related users who have a low frequency of communications are not taken into account or affect less in derivation of an overall rank, motivation to form a friend relationship mainly for the purpose of increasing the overall rank may be discouraged.

Calculation Method Based on the Number of Common Friends

In some cases, a greater number of common friends between users may exhibit a relatively high closeness. FIG. 8 shows friend relationships between user X and related users Y1 to Y8. In FIG. 8, the presence of a line connecting between X and Y1 to Y8 means that a friend relationship exists between the users. For example, user X and user Y3 have two common friends: users Y1 and Y2.

Table 2 below shows the personal ranks of the related users Y1 through Y8 and the number of common friends with user X.

TABLE 2

| Related user | Rank | Number of common friends |
|---|---|---|
| Y1 | 4.8 | 1 |
| Y2 | 4.2 | 1 |
| Y3 | 3.2 | 2 |
| Y4 | 6.0 | 0 |
| Y5 | 3.3 | 1 |
| Y6 | 2.5 | 1 |
| Y7 | 2.4 | 1 |
| Y8 | 1.5 | 3 |

According to an example method for deriving an overall rank based on the number of common friends, only the ranks of a certain number of related users in descending order of the number of common friends may be used. For example, if the ranks of the top two related users who have the greatest number of common friends are used, the personal ranks of related users Y8 and Y3 (1.5 and 3.2, respectively) would be used for deriving the overall rank of user X as per FIG. 8 and Table 2.

According to another example method for deriving an overall rank based on the number of common friends, closeness may be calculated from the ratio of the number of common friends to a friend list. That is to say, the closeness with each related user may be calculated with the maximum number of persons that can be common friends as the denominator and the number of common friends between the target user and respective related users as the numerator. Then, as the maximum number of common friends is seven in the case of Table 2 for example, the overall rank TRX of user X can be calculated as TRX=RX+(RY1$\times$1+RY2$\times$1+RY3$\times$2+RY4$\times$0+RY5$\times$1+RY6$\times$1+RY7$\times$1+RY8$\times$3)/7, where RX represents the user X's personal rank and RY1 to RY8 represent personal ranks of users Y1 to Y8, respectively.

According to yet another example method for deriving an overall rank based on the number of common friends, the friend list for user X and the friend list for each related user may be calculated and the closeness of each related user with respect to the target user may be determined. Further, the overall rank of user X may be calculated by taking a certain number of related users who have relatively high closeness values and adding their ranks to the personal rank of user X. Weighted addition according to the ranking of closeness and/or calculated values of closeness is also possible.

The closeness between users may be calculated with an algorithm.

According to some example embodiments, the personal rank of a related user may not be used for deriving an overall rank if the number of common friends with that user is below a certain threshold number. Assuming that a related user's rank is not used in derivation of an overall rank when the number of common friends with that related user is smaller than one, the personal rank of related user Y4 (6.0) is not used in derivation of an overall rank in the example of FIG. 8 and Table 2.

According to some example embodiments, correction factors corresponding to the number of common friends may be established as with the calculation method based on the frequency of communications described above and the personal rank of each related user corrected with the corresponding correction factor may be used in overall rank derivation.

When a calculation method based on the number of common friends is employed in derivation of an overall rank as described above, the ranks of users who have a greater number of common friends, that is, users who have higher closeness can contribute to an increased degree. Thus, an overall rank that corresponds with the reality of friend relationships more closely than when related users' personal ranks are used in a simple manner can be derived. Because the overall rank of a user can be increased as the user has more common friends, it works as an incentive for the user to actively form friend relationships.

Some example calculation methods that are based on frequency of communications and the number of common friends have been described. These methods may be combined to an extent that no inconsistency arises for use as a method for deriving an overall rank. For example, when a related user is a family member of the target user, the related user can have a high frequency of communications but may not have a small number of common friends. By adopting a method that uses a related user's personal rank for derivation of an overall rank regardless of the number of common friends when the related user has a frequency of communications exceeding a certain threshold value, it is possible to derive an overall rank that corresponds with the reality of friend relationships with the user even in such a scenario.

<Deriving an Overall Rank Based on the Duration of Friend Relationship>

The overall rank assessment unit 30 of the management server 100 according to an example embodiment of the present inventive concepts may derive an overall rank based on the duration of a friend relationship. Table 3 shows the duration of being a friend between the target user and users related to the target use and corresponding values of a correction factor $\beta$. The correction factor $\beta$ assumes a greater value for a longer duration of being a friend.

TABLE 3

| Duration of friend relationship | Correction factor $\beta$ |
|---|---|
| 10 years or more | 1.0 |
| 8 years or more | 0.9 |
| 6 years or more | 0.8 |
| 4 years or more | 0.7 |
| 2 years or more | 0.6 |
| 1 year or more | 0.5 |
| 6 months or more | 0.4 |

TABLE 3-continued

| Duration of friend relationship | Correction factor $\beta$ |
|---|---|
| 3 months or more | 0.3 |
| 1 month or more | 0.2 |
| 2 weeks or more | 0.1 |
| Less than 2 weeks | 0.0 |

According to an example embodiment, correction factors $\beta$ corresponding to the duration of friend relationships between user X and the related users Y1, Y2, Y3, ..., and Yn may be denoted as $\beta 1, \beta 2, \beta 3, \ldots$, and $\beta n$, respectively. Then, the overall rank TRX of user X can be calculated as $TRX=RX+\beta 1 \times RY1+\beta 2 \times RY2+\beta 3 \times RY3+ \ldots +\beta n \times RYn$. According to some example embodiments, instead of using correction factors, the personal ranks of related users whose duration of friend relationship is equal to or longer than a certain threshold period of time may be used for calculation of an overall rank. It is also possible not to use the personal rank of a related user in calculation of an overall rank if the user's duration of friend relationship with the related user is shorter than a certain threshold period of time.

As described above, when a calculation method based on the duration of friend relationship is employed in derivation of an overall rank, the ranks of related users who have been in a friend relationship for a longer duration are reflected in the overall rank to an increased degree. Thus, an overall rank that corresponds with the reality of friend relationships more closely than when related users' personal ranks are used in a simple manner can be derived. As the points of a related user who has a longer duration of friend relationship are given a greater weight, it works as an incentive for users to utilize SNS services to remain as a friend with the target user for a longer term. Further, since the rank of a related user who has a shorter duration of friend relationship is not reflected or is reflected to a decreased degree in derivation of an overall rank, motivation to form a friend relationship for a relative short duration mainly for the purpose of increasing the overall rank may be discouraged.

<Deriving an Overall Rank Based on the Personal Rank of an Indirectly Related User who is Further Associated with a Related User Via a Friend Relationship>

FIG. 9 schematically illustrates relationships between related users and indirectly related users. Here, the term "indirectly related user" refers to a user who is associated with a related user via a friend relationship and who is not in a friend relationship with the target user. In FIG. 9, the related users of X are Y1 and Y2. The related user Y1 has friend relationships with users Z11 and Z12 and user X does not have friend relationships with the users Z11 and Z12. Thus, the users Z11 and Z12 are indirectly related users to user X. Similarly, users Z21, Z22, and Z23 are indirectly related users to user X.

The related user evaluation information acquisition unit 20 of the management server 100 according to an example embodiment of the present inventive concepts obtain the personal ranks RX, RY1, and RY2 of user X, for which the overall ranks is to be calculated, and users Y1 and Y2, who are directly related to user X, as well as the personal ranks RZ11, RZ12, RZ21, RZ22, and RZ23 of users Z11, Z12, Z21, Z22, and Z23, who are indirectly related to user X.

The overall rank assessment unit 30 of the management server 100 according to an example embodiment of the present inventive concepts then may calculate the overall ranks of the related users. In FIG. 9, the overall ranks TRY1 and TRY2 of the related users Y1 and Y2 may be calculated as TRY1=RY1+(R11+R12)×γ, and TRY2=RY2+(R21+R22+R33)×γ, respectively. The value "γ" is a parameter that governs the degree to which the personal rank of an indirectly related user contributes to the overall rank of a related user. The value of γ may be set as desired. For example, the value of γ may be set 0 or more and less than 1. If the value of γ is set to a too high value, contribution of the personal rank of an indirectly related user may be too high, and thus the degree of contribution of a directly related user's personal rank in calculating the overall rank may be reduced.

The overall rank assessment unit 30 may calculate the overall ranks TRY1 and TRY2 of the related users before calculating the overall rank TRX. In this case, TRY1 and TRY2 may be added to the personal rank of user X as TRX=RX+TRY1+TRY2, for example.

<Deriving an Overall Rank Based on Content Present Information>

The overall rank assessment unit 30 of the management server 100 according to an example embodiment of the present inventive concepts may also derive an overall rank based on content present information. The term "content" used herein refers to, for example, audio, music, photos, videos, software, programs, and other kinds of information. When used herein, the term "content present information" means a user handing over content to another user, purchasing content in place of another user, or making content available for use by another user. The content present information includes, for example, information on the user to which the content has been given, the time the content was given, the details of the content given, the price of the content, etc.

The content present information may be located anywhere as long as it can be referenced by the management server 100 when desired. The content present information may be maintained on the SNS server 200 or stored on a storage server separate from the management server 100 and/or the SNS server 200 that can be accessed over a network. According to some example embodiments, the management server 100 may receive content present information when it receives a request for calculating an overall rank from outside (e.g., the SNS server 200).

FIG. 10 is a schematic illustration representing exchanges of content as presents between a target user and users related to the target user. An arrow-headed line indicates that content has been given as a present by a user to the user pointed by the arrow. A white star indicates content that has been given by user X to a related user. A black star indicates content that has been given by a related user to user X. FIG. 10 shows that one piece of content has been given by user X to user Y1 within a certain period, that one piece of content has been given by user Y2 to user X, that two pieces of content have been given by user X to user Y3, and that one piece of content has been given by user Y3 to user X. Between user X and user Y4, no content present information exists.

Several methods for deriving an overall rank based on content present information will be shown below. In the description that follows, the personal ranks of users X, Y1, Y2, Y3, and Y4 will be denoted as RX, RY1, RY2, RY3, and RY4, respectively, and the overall rank of user X will be denoted as TRX.

One possible method is to weight the personal rank of a related user according to the number of pieces of content that have been given within a certain period to the related user by the target user for which the overall rank is to be derived. Supposing that 0.2 is added per content given as a present, the overall rank of user X may be: TRX=RX+1.2×RY1+RY2+1.4×RY3+RY4. In the illustrated example, as user X has given user Y1 one piece of content, 1.2×RY1 is added to RX. Likewise, as user X has given user Y3 two pieces of content, 1.4×RY3 is added to RX. As user X has given no content to user Y2 and user Y4, RY2 and RY4 are added to RX.

In the case of weighting the personal rank of a related user to whom the target user has given content, the personal rank of the related user to whom content has been given can be obtained with a weight when the overall rank of the target user is derived. This can provide users with an incentive to give content to related users as presents.

According to some example embodiments, the personal rank of a related user who has given content to the target user may be weighted. In the example of FIG. 10, users Y2 and Y3 have given content to user X, so RY2 and RY3 may be added to RX with weights. In such an example embodiment, a user can give content to another user because the user can make his own personal rank be applied with a weight to the overall rank of the other user by giving content to him. Thus, a method for deriving the overall rank based on content present information can provide users with an incentive to give content to other users.

According to some example embodiments, the personal rank of a related user may be weighted based on both a case of his giving content to the target user and a case of his being given content by the target user.

Further, weighting may be varied in accordance with the details of content being given. According to some example embodiments, the management server 100 according to an example embodiment of the present inventive concepts may receive priority content information when receiving an instruction for calculating an overall rank, for example, from the SNS server 200. The term "priority content information" refers to an instruction for a specific weighting of a personal rank in calculation of an overall rank if the content matches a specific parameter in terms of the content type, vender, or the like.

As an example, in the case of calculating the overall rank with weighting of the personal rank of a related user if the related user has given content to user X, suppose that the content given by user Y2 to user X is game content provided by Company A, and the content given by user Y3 to user X is game content provided by Company B. Then, the weight for the personal rank may be varied depending on whether the content that has been given meets specific conditions for content. For example, 1 may be added to the weight when the game content provided by Company A has been given, and 0.2 may be added to the weight when other content has been given. When this weight adjustment scheme is adopted, a user who has been given content can purchase content from the same company with advantage, thereby giving users an incentive to purchase, for example, the same content from the same company.

<Rank including an Evaluation that is Made by an Increase or a Decrease of the Rank>

While the overall rank calculation methods described thus far are all based on positive evaluations, the overall rank calculation methods may include negative evaluations. For example, an overall rank may be decreased and/or increased through evaluation and the evaluation may become negative as a result of a decrease in the rank. For example, when a user has been given a positive evaluation, the user's personal rank may assume a positive value, and when the user has been given a negative evaluation, the user's personal rank may assume a negative value. According to some example embodiments, arrangements may be made so that a privilege is given to the user when the user's overall rank is a positive value, but no privilege is given to the user or some or all of services available for use are limited when the overall rank is a negative value.

Example cases of giving a negative evaluation to a user's rank are shown below. For instance, if a user fraudulently or deceivingly utilized a service of an SNS or the like, a negative evaluation may be given to the user in accordance with the type or degree of the fraudulency. For example, a negative evaluation may be given to a user who is utilizing a payment service, for example, and has a payment success rate that is relatively low or below a certain threshold value. For example, a negative evaluation may be given to a user if the user utilizes SNS services at a relatively low rate or a rate below a a certain threshold value. According to some example embodiments, an SNS operator may give a negative evaluation to a user who committed an act against the intent or policy of the SNS services (e.g., a user's act against terms of use or an act that hinders a health of business).

Referring now to Table 4 shown below, a specific example of overall rank derivation will be shown for a case where ranks include negative evaluations. Table 4 shows the personal ranks of related users Y1, Y2, Y3, and Y4 for user X.

TABLE 4

| Related user | Rank |
|---|---|
| Y1 | 3.0 |
| Y2 | −4.0 |
| Y3 | 1.0 |
| Y4 | 2.0 |

For example, the overall rank TRX of user X may be calculated as TRX=RX+3.0−4.0+1.0+2.0, where RX represents the personal rank of user X.

According to some example embodiments, the overall rank may be calculated by using both the top two personal ranks of related users and the lowest personal rank if any related user has a negative personal rank. In the example of Table 4, TRX is calculated as TRX=RX+3.0+2.0−4.0=RX−1.0. Adopting such a scheme makes the overall evaluation of the target user affected more by negative evaluations if the target user has a related user whose personal rank is negative.

As described above, according to an example embodiment of the present inventive concepts, negative evaluations can be included in personal ranks so that the negative evaluations are reflected in calculation of an overall rank. Thus, if the personal rank of a certain user is negative, the user's negative evaluation will be reflected in calculation of the overall rank of a related user who has a friend relationship with that user, thereby causing a disadvantage to the related user. Such a mechanism can provide users who utilize SNS or like services with an incentive to properly utilize services, for example, adhering to the terms of use so as not to get a negative evaluation.

The foregoing management methods and apparatus performing the same may be realized by hardware elements, at least one processor executing software elements, and/or combinations thereof. For example, the devices and components illustrated in the example embodiments of the present inventive concepts may be implemented by processing circuitry such as a computer, a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods and apparatus according to the above-described example embodiments of the present inventive concepts may be implemented with program instructions which may be executed by various processing circuitry or at least one processor and may be recorded in non-transitory computer-readable media. The non-transitory computer-readable media may also include, alone or in combination with the program instructions, data files, data structures, and the like. The program instructions recorded in the media may be designed and configured especially for the example embodiments of the present inventive concepts or be known and available to those skilled in computer software. Program instructions may include both machine codes, such as produced by a compiler, and higher-level language codes which may be executed by the computer using an interpreter. The described hardware devices may be configured to as one or more modules or units to perform the operations of the above-described example embodiments of the inventive concepts, or vice versa.

As described above, according to an example embodiment of the present inventive concepts, users of an SNS or the like can be encouraged to actively form friend relationships and also incentivized to actively utilize services provided by an SNS and the like.

The present inventive concepts are not limited to the above-described example embodiments but may be modified when appropriate without departing from the scope of the inventive concepts. Example embodiments may be carried out in combination to an extent that no inconsistency arises.

What is claimed is:

1. A management server configured to assign user ranks in response to demands from social media services, the management server comprising:
   a memory configured to store computer-readable instructions; and
   one or more processors configured to execute the instructions to,
      receive a first command for determining an overall rank of a target user from a social networking service (SNS) server, the first command including a range of related users associated with the target user, determine a personal rank of a target user based on the first command, a SNS utilization record for the target user from the SNS server, the SNS utilization record including at least one of a frequency of utilization of at least one SNS service, an amount of money spent for the at least one SNS service, or an amount of money spent for other services associated with the at least one SNS service, obtain personal ranks of related users who are in the range and associated with the target user based on the SNS utilization record for each of the related users from the SNS server, determine an overall rank of the target user based on one or more personal ranks of one or more of the related users and the personal rank of the target user, the one or more of the related users selected from the related users or weighted differently based on a relationship condition of each of the related users with the target user, and allow one or more privileges to the target user based on the determined overall rank, the one or more privileges including at least one of a price discount, a coupon, an upgrade of audio quality, access to additional features, or an allotment of points.

2. The management server according to claim 1, wherein respective one of the related users is associated with the target user via a mutually accepted friend relationship.

3. The management server according to claim 2, wherein the one or more processors are further configured to execute the instructions to derive the overall rank of the target user based on closeness between the target user and respective one of the related users.

4. The management server according to claim 3, wherein the closeness is calculated based on a number of common friends between the target user and respective one of the related users.

5. The management server according to claim 3, wherein the closeness is calculated based on frequency of communications between the target user and respective one of the related users.

6. The management server according to claim 2, wherein the one or more processors are further configured to execute the instructions to determine the overall rank of the target user based on a duration of the friend relationship.

7. The management server according to claim 1, wherein the one or more processors are further configured to execute the instructions to adjust the personal rank based on an evaluation result.

8. The management server according to claim 7, wherein the evaluation result causes a decrease in the personal ranks when a user from among the target user and at least one of the related users has utilized a service against prescribed conditions of usage.

9. The management server according to claim 1, wherein the one or more processors are further configured to execute the instructions to obtain a personal rank of at least one indirectly related user who is directly associated with at least one of the related users via a friend relationship while being not directly associated with the target user.

10. The management server according to claim 1, wherein the one or more processors are further configured to execute the instructions to determine the overall rank of the target user based on content present information between the target user and respective one of the related users.

11. A method for assigning user ranks in a membership management server in response to demands from social media services, which includes a memory configured to store computer-readable instructions and one or more processors configured to execute the instructions, the method comprising:

receiving a first command for determining an overall rank of a target user from a social networking service (SNS) server, the first command including a range of related users associated with the target user;

determining, by the one or more processors, a personal rank of a target user based on the first command, a SNS utilization record for the target user, from the SNS server, the SNS utilization record including at least one of a frequency of utilization of at least one SNS service, an amount of money spent for the at least one SNS service, or an amount of money spent for other services associated with the at least one SNS service;

obtaining, by the one or more processors, personal ranks of related users who are in the range and associated with the target user based on the SNS utilization record for each of the related users from the SNS server;

determining, by the one or more processors, an overall rank of the target user based on one or more personal ranks of the related user and the personal rank of the target user, the one or more of the related users selected from the related users or weighted differently based on a relationship condition of each of the related users with the target user; and allowing, by the one or more processors, one or more privileges to the target user based on the determined overall rank, the one or more privileges including at least one of a price discount, a coupon, an upgrade of audio quality, access to additional features, or an allotment of points.

12. The method of claim 11, wherein respective one of the related users is associated with the target user via a mutually accepted friend relationship.

13. The method of claim 11, wherein the determining an overall rank of the target user further includes determining the overall rank based on closeness between the target user and respective one the related users.

14. The method of claim 13, wherein the closeness is calculated based on a number of common friends between the target user and respective one of the related users.

15. The method of claim 13, wherein the closeness is calculated based on frequency of communications between the target user and respective one of the related users.

16. The method of claim 12, wherein the determining an overall rank of the target user includes driving the overall rank of the target user based on a duration of the friend relationship.

17. The method of claim 11, wherein the obtaining a personal rank includes adjusting the personal ranks based on an evaluation result.

18. The method of claim 17, wherein the evaluation result causes a decrease in the personal rank when a user from among the target user and at least one of the related users has utilized a service against prescribed conditions of usage.

19. The method of claim 11, wherein the obtaining a personal rank of at least one related user who is associated with the user includes obtaining a personal rank of an indirectly related user who is directly associated with at least one of the related users via a friend relationship, while being not directly associated with the target user.

20. The method of claim 11, wherein the determining an overall rank of the target user includes driving the overall rank of the target user based on content present information between the target user and respective one of the related users.

\* \* \* \* \*